United States Patent [19]

Nowlin

[11] Patent Number: 4,833,111
[45] Date of Patent: May 23, 1989

[54] CATALYST COMPOSITION FOR POLYMERIZING ALPHA-OLEFIN POLYMERS OF NARROW MOLECULAR WEIGHT DISTRIBUTION

[75] Inventor: Thomas E. Nowlin, Somerset, N.J.

[73] Assignee: Mobil Oil Corporation, New York, N.Y.

[21] Appl. No.: 143,987

[22] Filed: Jan. 14, 1988

[51] Int. Cl.$^4$ ............................................. C08F 4/64
[52] U.S. Cl. ................................. 502/107; 502/110; 502/111; 502/112; 502/115; 526/129; 526/142
[58] Field of Search ............... 502/110, 111, 115, 125, 502/112, 107

[56] References Cited

U.S. PATENT DOCUMENTS

| | | | |
|---|---|---|---|
| 2,905,645 | 9/1959 | Anderson et al. | 252/429 |
| 2,912,419 | 11/1959 | Peters et al. | 260/93.7 |
| 2,936,291 | 5/1960 | Peters et al. | 252/431 |
| 3,052,660 | 9/1962 | Osgan | 260/88.2 |
| 3,135,809 | 6/1964 | Bosmasian | 502/103 X |
| 3,574,138 | 4/1971 | Ziegler et al. | 502/117 |
| 3,787,384 | 1/1974 | Stevens et al. | 260/94.9 |
| 4,148,754 | 4/1979 | Strobel et al. | 252/429 |
| 4,296,223 | 10/1981 | Berger | 502/134 X |
| 4,378,304 | 3/1983 | Dombro | 502/111 |
| 4,458,058 | 7/1984 | Dombro | 526/129 |
| 4,481,301 | 11/1984 | Nowlin et al. | 502/104 |
| 4,558,024 | 12/1985 | Best | 502/115 |
| 4,558,025 | 12/1985 | Best | 502/115 |
| 4,579,835 | 4/1986 | Best | 502/120 |
| 4,668,650 | 5/1987 | Lo et al. | 502/111 |
| 4,732,882 | 3/1988 | Allen et al. | 502/115 R |

OTHER PUBLICATIONS

U.S. Ser. No. 17,285, filed 2/20/87, Lo et al.
U.S. Ser. No. 143,989, filed 1/14/88, Nowlin et al.
U.S. Ser. No. 37,680, filed 4/18/87, Allen et al.

*Primary Examiner*—Patrick P. Garvin
*Attorney, Agent, or Firm*—Alexander J. McKillop; Charles J. Speciale; Stanislaus Aksman

[57] ABSTRACT

A supported alpha-olefin polymerization catalyst composition is synthesized by reacting (1) a slurry of a solid catalyst carrier in a non-polar solvent, e.g., hexane, with a dialkyl organomagnesium composition; (2) contacting the slurry of step (1) with a hydroxyl group-containing compound, e.g., an alcohol; (3) contacting the slurry of step (2) with at least one transition metal compound; (4) contacting the slurry of step (3) with a halogenated alkyl aluminum compound, e.g., ethyl aluminum dichloride, and, (5) activating the product of step (5) with trimethylaluminum. The resulting catalyst composition is extremely active in polymerizing $C_2$–$C_{10}$ alpha-olefins and exhibits very good higher ($C_3$–$C_{10}$) alpha-olefins incorporation properties.

66 Claims, No Drawings

CATALYST COMPOSITION FOR POLYMERIZING ALPHA-OLEFIN POLYMERS OF NARROW MOLECULAR WEIGHT DISTRIBUTION

BACKGROUND OF THE INVENTION

1. Field of the Invention

The present invention relates to a method for polymerizing alpha-olefins, a catalyst for such a polymerization method and a method for producing such a catalyst. In particular, the present invention relates to a catalyst, and a method for preparation thereof, which produces linear low density polyethylene (LLDPE) having narrow molecular weight distribution, as evidenced by relatively low values of melt flow ratio (MFR), and low hexane extractables, suitable for film and injection molding applications. The invention is also directed to a highly productive polymerization process carried out with the catalyst of the invention.

2. Description of the Prior Art

Linear low density polyethylene polymers possess properties which distinguish them from other polyethylene polymers, such as homopolymers of polyethylene. Certain of these properties are described in Anderson et al, U.S. Pat. No. 4,076,698.

Karol et al, U.S. Pat. No. 4,302,566, describe a process for producing linear low density polyethylene polymers in a gas phase, fluid bed reactor.

Graff, U.S. Pat. No. 4,173,547, Stevens et al, U.S. Pat. No. 3,787,384, Strobel et al, U.S. Pat. No. 4,148,754, and Ziegler, deceased, et al, U.S. Pat. No. 4,063,009, each describe various polymerization processes suitable for producing forms of polyethylene other than linear low density polyethylene, per se.

Graff, U.S. Pat. No. 4,173,547, describes a supported catalyst obtained by treating a support with both an organoaluminum compound and an organomagnesium compound followed by contacting this treated support with a tetravalent titanium comound.

Stevens et al, U.S. Pat. No. 3,787,384, and Strobel et al, U.S. Pat. No. 4,148,754, describe catalysts prepared by first reacting a support (e.g., silica containing reactive hydroxyl groups) with an organomagnesium compound (e.g., a Grignard reagent) and then combining this reacted support with a tetravalent titanium compound. According to the teachings of both of these patents, no unreacted organomagnesium compound is present when the reacted support is contacted with the tetravalent titanium compound.

Ziegler, deceased, et al, U.S. Pat. No. 4,063,009, describe a catalyst which is the reaction product of an organomagnesium compound (e.g., an alkylmagnesium halide) with a tetravalent titanium compound. The reaction of the organomagnesium compound with the tetravalent titanium compound takes place in the absence of a support material.

A vanadium-containing catalyst, used in conjunction with triisobutylaluminum as a co-catalyst, is disclosed by W. L. Carrick et al in *Journal of American Chemical Society*, Volume 82, page 1502 (1060) and Volume 83, page 2654 (1961).

Nowlin et al, U.S. Pat. No. 4,481,301, disclose a supported alpha-olefin polymerization catalyst composition prepared by reacting a support containing OH groups with a stoichiometric excess of an organomagnesium composition, with respect to the OH groups content, and then reacting the product with a tetravalent titanium compound.

Dombro, U.S. Pat. Nos. 4,378,304 and 4,458,058, disclose an olefin polymerization catalyst composition synthesized by sequentially reacting: (1) a porous support with a Group IIA organometallic compound, e.g., a dialkylmagnesium; (2) the product of step (1) with water or a hydrocarbyl alcohol, e.g., methanol; (3) the product of step (2) with a transition metal compound or compounds. The product of the synthesis reaction is activated with a co-catalyst which is a Group IA, IIA, IIIA and/or IIB organometallic compound, including hydrogen. Suitable co-catalysts are n-butyllithium, diethylmagnesium, triisobutylaluminum and diethylaluminum chloride.

Best, U.S. Pat. Nos. 4,558,024, 4,558,025 and 4,579,835, disclose olefin polymerization catalyst compositions prepared by reacting together a porous particulate material, an organic magnesium compound, an oxygen-containing compound, a transition metal compound, e.g., a titanium compound (the '024 patent) or a vanadium compound (the '835 patent), and a co-catalyst. Some of the catalyst compositions of Best also include an acyl halide (e.g., see the '835 and the '025 patents) and/or a Group IIIA hydrocarbyl dihalides, such as boron and aluminum alkyl dihalides (e.g., the '025 patent).

When the LLDPE resins are fabricated into injection-molded products, it is imperative to assure that such products are not susceptible to warping or shrinking. As is known to those skilled in the art, the degree of warping or shrinking can be predicted from the molecular weight distribution of the resins. Resins having relatively narrow molecular weight distribution produce injection-molded products exhibiting a minimum amount of warping or shrinkage. Conversely, resins having relatively broad molecular weight distribution produce injection-molded products more likely to undergo warping or shrinkage. One of the measures of the molecular weight distribution of the resin is melt flow ratio (MFR), which is the ratio of high melt flow index (HIMI or $I_{21}$) to melt index ($I_2$) for a given resin. The melt flow ratio is believed to be an indication of the molecular weight distribution of the polymer, the higher the value, the broader the molecular weight distribution. Resins having relatively low MFR values, e.g., of about 20 to about 50, have relatively narrow molecular weight distribution. Additionally, LLDPE resins having such relatively low MFR values produce films of better strength properties than resins with high MFR values. Many catalyst systems exhibit a tendency to produce resins whose MFR values, although initially low, increase with increased concentration of the catalyst activator, also known as a co-catalyst, such as various aluminum alkyls.

Another important property of LLDPE resins, manufactured into products coming into contact with articles subject to FDA regulations, e.g., foodstuffs, is hexane extractables which is a measure of the amount of low molecular weight and/or highly branched polymer molecules capable of being extracted from the manufactured products, e.g., plastic food containers, by hexane extraction. The FDA imposed strict regulations on the amounts of allowable hexane extractables in such plastic products.

Thus, Allen et al, European Patent Office (EPO) Application No. 87300536.1, published on Aug. 5, 1987, as publication No. 0231102, dislose an alpha-olefin polymerization catalyst composition activated with trimethylaluminum which produces polymers having relatively low values of MFR and low hexane extractables. However, the productivity of the polymerization process carried out with such a catalyst composition is lower than that of the process carried out with the same catalyst composition activated with more commonly-used activators, such as triethylaluminum and triisobutylaluminum.

Another important property of an alpha-olefin polymerization catalyst composition is the ability thereof to effectively copolymerize ethylene with higher alpha-olefins, e.g., $C_3$–$C_{10}$ alpha-olefins, to produce resins having low densities. Such resins have important advantages, e.g., they are used to produce polyethylene film with excellent physical properties which is, therefore, substantially more resistant to tearing and puncturing than a film made from similar resins of higher densities. This property of the catalyst composition is referred to as "higher alpha-olefin incorporation property" and is usually measured by determining the amount of higher alpha-olefin (e.g., butene, hexene or octene) required in the polymerization process, e.g. fluid-bed reactor process, to produce a copolymer of ethylene and the higher alpha-olefin having a given density. The lesser is the amount of the higher alpha-olefin required to produce a resin of a given density, the higher are the production rates and, therefore, the lower is the cost of producing such a copolymer. Catalysts having good higher α-olefin incorporation properties are referred to in the art as having a high α-olefin incorporation factor. High values of the high α-olefin incorporation factor are especially important in the gas-phase fluid bed process, because relatively high concentrations of higher α-olefin in the fluid-bed reactor may cause poor fluidization caused, e.g., by resin stickiness. Therefore, production rates must be significantly reduced to avoid such problems. Consequently, catalyst compositions with a relatively high α-olefin incorporation factor values avoid these problems and are more desirable.

Accordingly, it is important to provide a catalyst composition capable of producing alpha-olefin polymers and copolymers having relatively narrow molecular weight distribution (low MFR values) and low densities.

It is therefore a primary object of the present invention to provide a high activity catalyst for the polymerization of alpha-olefins yielding products of a relatively narrow molecular weight distribution which is maintained substantially constant with varying amounts of the co-catalyst concentration.

It is another object of the present invention to provide a high activity catalyst composition which produces alpha-olefin polymers having relatively low hexane extractables.

It is yet another object of this invention to provide a high activity catalyst composition which has excellent higher alpha-olefin incorporation properties.

It is an additional object of the present invention to provide a catalytic process for polymerizing alpha-olefins which yields linear low density polyethylene of a relatively narrow molecular weight distribution at high productivity rates.

SUMMARY OF THE INVENTION

A supported alpha-olefin polymerizaion catalyst composition of this invention is prepared in a multi-step process. In the first step, a mixture of a solid, porous carrier and a non-polar solvent is contacted with at least one organomagnesium composition of the formula $$R_m MgR_n'  \qquad (I)$$

where R and R' are the same or different $C_4$–$C_{12}$ alkyl groups, m and n are each 0, 1 or 2, providing that m+n equals the valence of Mg. Subsequently, the mixture of the first step is contacted with at least one compound of formula (II), $R^2$—OH, where $R^2$ is a $C_1$–$C_{10}$ alkyl group or a $C_1$–$C_{10}$ halogenated alkyl group. The mixture is then contacted with at least one transition metal compound soluble in the non-polar solvent. The resulting mixture is subsequently contacted with a halogenated alkyl aluminum compound of the formula:

$$R_y^3 AlX_{(3-y)}  \qquad (III)$$

where $R^3$ is a $C_1$–$C_{10}$ alkyl group, X is Cl, Br or I and y is 1 or 2. The product is dried and it is activated with the trimethylaluminum catalyst activator. The resulting activated catalyst composition has substantially higher productivity in the polymerization of alpha-olefins, and substantially improved higher comonomer (i.e., $C_3$–$C_{10}$ alpha-olefin) incorporation properties, than similar catalyst compositions prepared without the halogenated alkyl aluminum compound. The catalyst also produces polymers having relatively narrow molecular weight distribution and low hexane extractables.

DETAILED DESCRIPTION OF THE INVENTION

The polymers prepared in the presence of the catalyst composition of this invention are linear polyethylenes which are homopolymers of ethylene or copolymers of ethylene and higher alpha-olefins. The polymers exhibit relatively low values of melt flow ratio (MFR), as compared to similar polymers prepared in the presence of previously-known catalyst compositions, e.g., those disclosed by Nowlin et al, U.S. Pat. No. 4,481,301. Thus, the polymers prepared with the catalyst compositions of the invention are especially suitable for the production of films and injection molding applications. I suprisingly discovered that the treatment of the mixture or a slurry of the product of the third catalyst synthesis step in the non-polar solvent with the halogenated aluminum alkyl compound substantially improves catalyst productivity (by about 20% to about 80%) and higher alpha-olefin incorporation properties thereof as compared to a catalyst not treated with the halogenated alkyl aluminum compound.

Catalysts produced according to the present invention are described below in terms of the manner in which they are made.

Catalyst Synthesis

The carrier material is a solid, particulate, porous, preferably inorganic material which is inert to the other compounds of the catalyst composition and to the other active components of the reaction system. These carrier materials include inorganic materials, such as oxides of silicon and/or aluminum. The carrier material is used in the form of a dry powder having an average particle size of from about 1 micron to about 250 microns, preferably from about 10 microns to about 150 microns. The carrier material is also porous and has a surface area of at least about 3 square meters per gram ($m^2/gm$), and preferably at least about 50 $m^2/gm$. The carrier material should be dry, that is, free of absorbed water. Drying of the carrier material can be effected by heating at about 100° C. to about 1000° C., preferably at about 600° C. When the carrier is silica, it is heated at least 200° C., preferably about 200° C. to about 850° C. and most preferably at about 600° C. The carrier material must have at least some active hydroxyl (OH) groups to produce the catalyst composition of this invention.

In the most preferred embodiment, the carrier is silica which, prior to the use thereof in the first catalyst synthesis step, has been dehydrated by fluidizing it with nitrogen and heating at about 600° C. for about 16 hours to achieve a surface hydroxyl group concentration of about 0.7 millimoles per gram (mmols/gm). The silica of the most preferred embodiment is a high surface area, amorphous silica (surface area=300 m²/gm; pore volume of 1.65 cm³/gm), and it is material marketed under the tradenames of Davison 952 or Davison 955 by the Davison Chemical Division of W. R. Grace and Company. The silica is in the form of spherical particles, e.g., as obtained by a spray-drying process.

The carrier material is slurried in a non-polar solvent and the resulting slurry is contacted with at least one organomagnesium composition having the empirical formula (I). The slurry of the carrier material in the solvent is prepared by introducing the carrier into the solvent, preferably while stirring, and heating the mixture to about 25° and about 100° C., preferably to about 40° to about 60° C. The slurry is then contacted with the aforementioned organomagnesium composition, while the heating is continued at the aforementioned temperature.

The organomagnesium composition has the empirical formula $R_m MgR_n'$ where R and R' are the same or different $C_4$-$C_{12}$ alkyl groups, preferably $C_4$-$C_{10}$ alkyl groups, more preferably $C_4$-$C_8$ normal alkyl groups, and most preferably both R and R' are butyl groups, and m and n are each 0, 1 or 2, providing that m+n is equal to the valence of Mg.

Suitable non-polar solvents are materials in which all of the reactants used herein, i.e., the organomagnesium composition, the compound of formula (II), the halogenated alkyl aluminum compound, and the transition metal compound, are at least partially soluble and which are liquid at reaction temperatures. Preferred non-polar solvents are alkanes, such as hexane, n-heptane, octane, nonane, and decane, although a variety of other materials including cycloalkanes, such as cyclohexane, aromatics, such as benzene and ethylbenzene, may also be employed. The most preferred non-polar solvent is hexane. Prior to use, the non-polar solvent should be purified, such as by percolation through silica gel and/or molecular sieves, to remove traces of water, oxygen, polar compounds, and other materials capable of adversely affecting catalyst activity.

In the most preferred embodiment of the synthesis of this catalyst it is important to add only such an amount of the organomagnesium composition that will be deposited—physically or chemically—onto the support since any excess of the organomagnesium composition in the solution may react with other synthesis chemicals and precipitate outside of the support. The carrier drying temperature affects the number of sites on the carrier available for the organomagnesium composition—the higher the drying temperature the lower the number of sites. Thus, the exact molar ratio of the organomagnesium composition to the hydroxyl groups will vary and must be determined on a case-by-case basis to assure that only so much of the organomagnesium composition is added to the solution as will be deposited onto the support without leaving any excess of the organomagnesium composition in the solution. Furthermore, it is believed that the molar amount of the organomagnesium composition deposited onto the support is greater than the molar content of the hydroxyl groups on the support. Thus, the molar ratios given below are intended only as an approximate guideline and the exact amount of the organomagnesium composition in this embodiment must be controlled by the functional limitation discussed above, i.e., it must not be greater than that which can be deposited onto the support. If greater than that amount is added to the solvent, the excess may react with the compound of formula (II), thereby forming a precipitate outside of the support which is detrimental in the synthesis of our catalyst and must be avoided. The amount of the organomagnesium composition which is not greater than that deposited onto the support can be determined in any conventional manner, e.g., by adding the organomagnesium composition to the slurry of the carrier in the solvent, while stirring the slurry, until the organomagnesium composition is detected as a solution in the solvent.

For example, for the silica carrier heated at about 600° C., the amount of the organomagnesium composition added to the slurry is such that the molar ratio of Mg to the hydroxyl groups (OH) on the solid carrier is about 1:1 to about 6:1, preferably about 2:1 to about 4:1, more preferably about 2:1 to about 3:1 and most preferably about 2.5:1. The organomagnesium composition dissolves in the non-polar solvent to form a solution from which the organomagnesium composition is deposited onto the carrier.

It is also possible to add such an amount of the organomagnesium composition which is in excess of that which will be deposited onto the support, and then remove, e.g., by filtration and washing, any excess of the organomagnesium composition. However, this alternative is less desirable than the most preferred embodiment described above.

After the addition of the organomagnesium composition to the slurry is completed, the slurry is contacted with at least one compound of the formula (II):

$$R^2\text{-OH} \qquad\qquad\qquad (II)$$

where $R^2$ is a $C_1$-$C_{10}$ alkyl group or a $C_1$-$C_{10}$ halogenated alkyl group, preferably $R^2$ is a $C_1$-$C_{10}$ alkyl group, more preferably a $C_1$-$C_4$ normal alkyl group or a $C_1$-$C_4$ halogenated normal alkyl group, and most preferably $R^2$ is an ethyl group or a halogenated ethyl group. If $R^2$ is a halogenated ethyl group, it is most preferably a trichloroethyl group. Thus, the compound of formula (II) is preferably an alcohol and most preferably ethanol. The amount of the compound of formula (II) used in this synthesis step is sufficient to convert substantially all of the magnesium-alkyl groups (MgR or MgR') on the support to magnesium-alkoxy (Mg-$OR^2$) groups. In a preferred embodiment, the amount of the formula (II) compound added is such that substantially no excess thereof is present in the non-polar solvent after substantially all of the magnesium alkyl groups are converted to the magnesium alkoxy groups on the carrier to prevent the reaction of the formula (II) compound with the transition metal compound outside of the carrier. This synthesis step is conducted at about 25° to about 65° C., preferably at about 30° to about 55° C., and most preferably at about 30° to about 40° C.

After the addition of the formula (II) compound is completed, the slurry is contacted with at least one transition metal compound soluble in the non-polar solvent. This synthesis step is conducted at about 25° to about 65° C., preferably at about 30° to about 55° C., and most preferably to about 30° to about 40° C. In a preferred embodiment, the amount of the transition metal compound added is not greater than that which can be deposited onto the carrier. The exact molar ratio of Mg to the transition metal and of the transition metal to the hydroxyl groups of the carrier will therefore vary (depending, e.g., on the carrier drying temperature) and must be determined on a case-by-case basis. For example, for the silica carrier heated at about 200° to about 850° C., the amount of the transition metal compound is such that the molar ratio of the transition metal, derived from the transition metal compound, to the hydroxyl groups of the carrier is about 1 to about 2.0, preferably about 1.5 to about 2.0. The amount of the transition metal compound is also such that the molar ratio of Mg to the transition metal is about 1 to about 3, preferably about 2 to about 3. I found that these molar ratios produce a catalyst composition which produces resins having relatively low melt flow ratio values of about 20 to about 35. As is known to those skilled in the art, such resins can be utilized to produce high strength films or injection molding products which are resistant to warping and shrinking.

Suitable transition metal compounds used herein are compounds of metals of Groups IVA, VA, VIA or VIII of the Periodic Chart of the Elements, as published by the Fisher Scientific Company, Catalog No. 5-702-10, 1978, providing that such compounds are soluble in the non-polar solvents. Non-limiting examples of such compounds are titanium and vanadium halides, e.g., titanium tetrachloride, TiCl$_4$, vanadium tetrachloride, VCl$_4$, vanadium oxytrichloride, VOCl$_3$, titanium and vanadium alkoxides, wherein the alkoxide moiety has a branched or unbranched alkyl radical of 1 to about 20 carbon atoms, preferably 1 to about 6 carbon atoms. The preferred transition metal compounds are titanium compounds, preferably tetravalent titanium compounds. The most preferred titanium compound is titanium tetrachloride.

Mixtures of such transition metal compounds may also be used and generally no restrictions are imposed on the transition metal compounds which may be included. Any transition metal compound that may be used alone may be used in conjunction with other transition metal compounds.

After the addition of the transition metal compound is completed, at least one halogenated alkyl aluminum compound is added to the reaction slurry. The halogenated alkyl aluminum compound has the formula:

where $R^3$ is a $C_1$–$C_{10}$ alkyl group, preferably a $C_1$–$C_5$ alkyl group, more preferably a $C_1$–$C_4$ normal alkyl group and most preferably $R^3$ is an ethyl group; X is Cl, Br or I, preferably Cl or Br and most preferably Cl; and y is 1 or 2. In the most preferred embodiment, the halogenated alkyl aluminum compound is ethylaluminum dichloride (EADC) or diethylaluminum chloride (DEAC). The amount of the halogenated alkyl aluminum compound added to the reaction mixture is such that the Al:transition metal (derived from the transition metal compound) molar ratio in the catalyst composition is about 0.1 to about 10, preferably about 0.5 to about 5 and most preferaly about 1.0 to about 2.0. It will be apparent to those skilled in the art that mixtures of the halogenated alkyl aluminum compounds may also be used in this step of the catalyst synthesis process. The halogenated alkyl alumimum compounds are preferably added to the reaction slurry while it is stirred at about 25° to about 65° C., preferably at about 30° to about 55° C., more preferably at about 30° to about 40° C. and most preferably while the slurry is maintained under reflux conditions. In a preferred embodiment, the amount of the halogenated alkyl aluminum compound used herein is not greater than that which can be deposited onto the carrier. Thus, in this embodiment, the exact molar ratio of Al:transition metal will therefore vary (depending, e.g., on the carrier drying temperature), and must be determined on a case-by-case basis.

After the addition of the halogenated alkyl aluminum compound is completed, the non-polar solvent is slowly removed, e.g., by distillation or evaporation. I found that the temperature at which the non-polar solvent is removed from the synthesis mixture affects the productivity of the resulting catalyst composition. Lower solvent removal temperatures produce catalyst compositions which are substantially more active than those produced with higher solvent removal temperatures. For this reason, it is preferred to remove the non-polar solvent at about 40° to about 65° C., preferably at about 45° to about 55° C. and most preferably at about 55° C. by drying, distillation or evaporation or any other conventional means.

The resulting free-flowing powder, referred to herein as a catalyst precursor, is combined with the trimethylaluminum (TMA) activator. I found that the combination of the precursor of this invention with the TMA activator produces an alpha-olefin polymerization catalyst composition having very high activity, as compared to a catalyst composition comprising the same catalyst precursor and other, more conventional catalyst activators, such as triethylaluminum (TEAL). This is additionally surprising and unexpected because other workers in this field found that, although TMA exhibits some advantages with other catalyst precursors, it decreases the activity of such precursors, e.g., see Allen et al, EPO Application No. 87300536.1. The catalyst composition of this invention, activated with TMA, also exhibits extremely good higher alpha-olefin (i.e., $C_3$–$C_{10}$ alpha-olefin) incorporation properties when it is used to polymerize ethylene with such higher alpha-olefins. The TMA activator is used in an amount which is at least effective to promote the polymerization activity of the solid catalyst component of this invention. The amount of the TMA activator is sufficient to give an Al:Ti molar ratio of about 15:1 to about 1000:1, preferably about 20:1 to about 300:1, and most preferably about 25:1 to about 100:1. It will be understood by those skilled in the art that this molar ratio refers to the aluminum derived from the TMA only and does not include any aluminum which may have been contributed by the halogenated alkyl aluminum compound of formula III.

Without wishing to be bound by any theory of operability, it is believed that the catalyst composition of this invention is produced by chemically impregnating the support with catalyst components sequentially added to the slurry of the carrier in the non-polar solvent. Therefore, all of the catalyst synthesis chemical ingredients must be soluble in the non-polar solvent used in the synthesis. The order of addition of the reagents may also be important since the catalyst synthesis procedure is predicated on the chemical reaction between the chemical ingredients sequentially added to the non-polar solvent (a liquid) and the solid carrier material or a catalyst intermediate supported by such a material (a solid). Thus, the reaction is a solid-liquid reaction. For example, the catalyst synthesis procedure must be conducted in such a manner as to avoid the reaction of two or more reagents in the non-polar solvent to form a reaction product insoluble in the non-polar solvent outside of the pores of the solid catalyst support. Such an insoluble reaction product would be incapable of reacting with the carrier or the catalyst intermediate and therefore would not be incorporated onto the solid support of the catalyst composition.

The catalyst precursors of the present invention are prepared in the substantial absence of water, oxygen, and other catalyst poisons. Such catalyst poisons can be excluded during the catalyst preparation steps by any well known methods, e.g., by carrying out the preparation under an atmosphere of nitrogen, argon or other inert gas. An inert gas purge can serve the dual purpose of excluding external contaminants during the preparation and removing undesirable reaction by-products resulting from the preparation of the neat, liquid reaction product. Purification of the non-polar solvent employed in the catalyst is also helpful in this regard.

The catalyst may be activated in situ by adding the TMA activator and catalyst separately to the polymerization medium. It is also possible to combine the catalyst and the activator before the introduction thereof into the polymerization medium, e.g., for up to about 2 hours prior to the introduction thereof into the polymerization medium at a temperature of from about $-40°$ to about $100°$ C.

Polymerization

Alpha-olefins are polymerized with the catalysts prepared according to the present invention by any suitable process. Such processes include polymerizations carried out in suspension, in solution or in the gas phase. Gas phase polymerization reactions are preferred, e.g., those taking place in stirred bed reactors and, especially, fluidized bed reactors.

The molecular weight of the polymer may be controlled in a known manner, e.g., by using hydrogen. With the catalysts produced according to the present invention, molecular weight may be suitably controlled with hydrogen when the polymerization is carried out at relatively low temperatures, e.g., from about $30°$ to about $105°$ C. This control of molecular weight may be evidenced by measurable positive change in melt index ($I_2$) of the polymer produced.

The molecular weight distribution of the polymers prepared in the presence of the catalysts of the present invention, as expressed by the MFR values, varies from about 20 to about 35, preferably about 20 to about 30, for LLDPE products having a density of about 0.900 to about 0.940 g/cc, and an $I_2$ (melt index) of about 0.1 to about 100. Conversely, HDPE products, produced with the catalysts of this invention, have a density of about 0.940 to about 0.965, MFR values of about 20 to about 35, preferably about 20 to about 30, and $I_2$ values of about 0.1 to about 100. As is known to those skilled in the art, such MFR values are indicative of a relatively narrow molecular weight distribution of the polymer.

As is also known to those skilled in the art, such MFR values are indicative of the polymers especially suitable for injection molding applications since the polymers having such MFR values exhibit relatively low amounts of warpage and shrinkage on cooling of the injection molded products. The relatively low MFR values of the polymers prepared with the catalysts of this invention also indicate that they are suitable for the preparation of various film products since such films are likely to have excellent strength properties. MFR is defined herein as the ratio of the high load melt index (HLMI or $I_{21}$) dividied by the melt index, i.e., $$MFR = \frac{I_{21}}{I_2}$$

Smaller MFR values indicate relatively narrow molecular weight distribution polymers.

The catalysts prepared according to the present invention are highly active and may have an activity of at least about 2 to about 14 kilograms of polymer per gram of catalyst per 100 psi of ethylene in about 1 hour.

The linear polyethylene polymers prepared in accordance with the present invention are homopolymers of ethylene or copolymers of ethylene with one or more $C_3$–$C_{10}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/1-octene copolymers, ethylene/4-methyl/1-pentene copolymers, ethylene/1-butene/1-hexene terpolymers, ethylene/-propylene/1-hexene terpolymers and ethylene/-propylene/1-butene terpolmers. When propylene is employed as a comonomer, the resulting linear low density polyethylene polymer preferably has at least one other alpha-olefin comonomer having at least four carbon atoms in an amount of at least 1 percent by weight of the polymer. Accordingly, ethylene/propylene copolymers are possible, but not preferred. The most preferred comonomer is 1-hexene.

The linear low density polyethylene polymers produced in accordance with the present invention preferably contain at least about 80 percent by weight of ethylene units.

A particularly desirable method for producing linear low density polyethylene polymers according to the present invention is in a fluid bed reactor. Such a reactor and means for operating it are described by Levine et al, U.S. Pat. No. 4,011,382, Karol et al, U.S. Pat. No. 4,302,566 and by Nowlin et al, U.S. Pat. No. 4,481,301, the entire contents of all of which are incorporated herein by reference. The polymer produced in such a reactor contains the catalyst particles because the catalyst is not separated from the polymer.

The following examples further illustrate the essential features of the invention. However, it will be apparent to those skilled in the art that the specific reactants and reaction conditions used in the Examples do not limit the scope of the invention.

EXAMPLE 1

(Catalyst Precursor Synthesis)

A precursor composition of this invention was prepared by the following procedure. 15.3 grams of Davison grade 955 silica, previously calcined at $600°$ C. for about 16 hours (hrs) under a purge of dry nitrogen, was slurried in about 200 mls of dry hexane contained in a 4-neck 500 ml round bottom flask fitted with an overhead stirrer and under a slow nitrogen purge. This silica had a hydroxyl group concentration of 0.72 mmols/gram and it was used in all catalyst preparations of the Examples of this application. The flask contents were brought to reflux and 46.8 milliliters (mls) of dibutyl magnesium (DBM) was added dropwise as a 0.7 Molar solution in heptane. The reflux was continued for one hour. Next, 3.5 mls of absolute ethanol was diluted in about 50 mls of dry hexane and added dropwise to the slurry; reflux was continued for one hour. 1.8 mls of $TiCl_4$ was diluted with about 50 mls of dry hexane and added dropwise to the slurry. Following a one hour reflux, 12.6 mls of ethylaluminum dichloride (EADC) was added to the slurry as a 25 wt% solution in hexane, refluxed one hour and finally the solvents were removed by distillation to give a dry, free-flowing powder (20.9 grams).

EXAMPLE 2

(Catalyst Precursor Synthesis)

A sample of a catalyst precursor composition without a halogentated alkyl aluminum compound was prepared in this example. 177.4 grams of Davison grade 955 silica, previously calcined at 600° C. for about 16 hours (hrs) under a purge of dry nitrogen, was slurried in about 2.0 liters of dry hexane contained in a 4-neck, 3-liter round bottom flask fitted with an overhead stirrer and under a slow nitrogen purge. While refluxing, 538 mls of DBM (0.7 Molar solution in heptane) was added slowly to the slurry and reflux was continued for one hour. Next, 39 mls of absolute ethanol was diluted into about 400 mls of hexane and added very slowly to avoid a large exotherm. After the addition was completed, reflux was continued for one hour. Finally, 21 mls of $TiCl_4$, diluted into 250 mls of hexane, was added to the slurry and reflux continued for 1.5 hours after which the solvents were removed by distillation to give a white, free-flowing powder. Yield: 223 grams. If it is desired to use a halogenated alkyl aluminum compound in the synthesis, it is added after the addition of $TiCl_4$ is completed, as in Example 1.

EXAMPLE 3

(Catalyst Precursor Synthesis)

This catalyst precursor synthesis was carried out in substantially the same manner as that of Example 2, except that more titanium, in the form of $TiCl_4$, i.e., 28 mls of $TiCl_4$ diluted in 400 mls of hexane, was used. The chemical composition of the catalyst precursors of Examples 2 and 3 is summarized in Table 1.

TABLE 1

COMPOSITION OF CATALYSTS OF EXAMPLES 2 AND 3

| EXAMPLES | $MgR_3SiOH$ (mols/mols) | $TiCl_4/SiOH$ (mols/mols) | WT % Mg | Ti | Cl |
|---|---|---|---|---|---|
| 2 | 3.0 | 1.5 | 3.66 | 3.60 | 10.05 |
| 3 | 3.0 | 2.0 | 3.48 | 4.54 | 12.83 |

EXAMPLES 2A, 3A, and 3B (Catalyst Precursor Synthesis)

Additional catalyst precursors were prepared following the procedure of Example 1. A summary of the catalyst precursor compositions of Examples 1-3B is shown below:

| Example | Molar $MgR_2/$ SiOH | Molar $TiCl_4/$ SiOH | Modifier Type (Halogenated alkyl aluminum compound) | Molar Al/Ti |
|---|---|---|---|---|
| 1 | 3.0 | 1.5 | EADC | 1.0 |
| 2 (Comparat.) | 3.0 | 1.5 | None | 0.0 |
| 2A | 3.0 | 1.5 | DEAC | 1.0 |
| 3 (Comparat.) | 3.0 | 2.0 | None | 0.0 |
| 3A | 3.0 | 2.0 | DEAC | 1.0 |
| 3B | 3.0 | 2.0 | EADC | 1.0 |

EXAMPLES 4-15

(Polymerization Process)

Catalyst compositions of Examples 1-3B, activated either with triethylaluminum (TEAL) or with trimethylaluminum (TMA), were used to polymerize olefins. The polymerization process, and apparatus used therefor, for all of the examples was substantially the same as that of Example 9, summarized below:

In Example 9, 400 mls of dry hexane was added to a 1.6 liter autoclave reactor at 57° C. and under a slow nitrogen purge. 200 mls of 1-hexene was added, followed by 2.0 mls of trimethylaluminum (TMA) (25 wt% solution in hexane) and the reactor was closed. Next, hydrogen was added to increase the internal pressure at 54° C. to 25.5 psi. The temperature was increased to 70.5° C. while the contents were stirred at about 900 rpm and the internal pressure was increased to 120 psi with ethylene. 0.0327 grams of the catalyst precursor of Example 1 were added with ethylene over-pressure and the temperature was maintained at 80° C. After 40 minutes, 155 grams of copolymer were isolated. The copolymer contained 3.55 mole % 1-hexene and it had a melt index ($I_2$) and high load melt index ($I_{21}$) values of 0.74 and 21.7, respectively. The results of the polymerization experiments are summarized below in Tables 2 and 3.

TABLE 2

POLYMERIZATION DATA FOR TMA-ACTIVATED PRECURSORS

| EXAMPLE | Cat. of Example | Ti/OH | Halogenated Alkyl Aluminum Type | Amount Molar (Al/Ti) | Productivity (Gms PE/gm/hr) | $C_6=$ (Mole %) | Density (gms/cc) | MFR | $I_{21}$ |
|---|---|---|---|---|---|---|---|---|---|
| 4 | 3 (Comparat.) | 2.0 | None | 0.0 | 4750 | 4.6 | 0.912 | 30.5 | 58.4 |
| 5 | 3A | 2.0 | DEAC[A] | 1.0 | 5760 | 3.9 | 0.917 | 29.0 | 34.8 |
| 6 | 3B | 2.0 | EADC[B] | 1.0 | 6470 | 3.2 | 0.920 | 28.9 | 30.2 |
| 7 | 2 (Comparat.) | 1.5 | None | 0.0 | 3600 | 4.1 | 0.914 | 28.7 | 33.0 |
| 8 | 2A | 1.5 | DEAC | 1.0 | 4200 | 3.4 | 0.918 | 28.8 | 26.8 |
| 9 | 1 | 1.5 | EADC | 1.0 | 6300 | 3.5 | 0.920 | 29.3 | 21.7 |

[A] diethylaluminum chloride
[B] ethylaluminum dichloride

TABLE 3

POLYMERIZATION DATA FOR TEAL-ACTIVATED PRECURSORS

| EXAMPLE | Cat.[a] of Example | Ti/OH | Halogenated Alkyl Aluminum Type | Amount Molar (Al/Ti) | Productivity (Gms PE/gm/hr) | $C_6^=$ (mole %) | Density (gms/cc) | MFR | $I_{21}$ |
|---|---|---|---|---|---|---|---|---|---|
| 10 | 3 (Comparat.) | 2.0 | None | 0.0 | 2000 | 2.8 | 0.923 | 30.8 | 23.6 |
| 11 | 3A | 2.0 | DEAC | 1.0 | 3600 | 3.6 | 0.920 | 29.3 | 28.5 |
| 12 | 3B | 2.0 | EADC | 1.0 | 5460 | 3.2 | 0.922 | 28.4 | 25.7 |
| 13 | 2 (Comparat.) | 1.5 | None | 0.0 | 1230 | 2.2 | 0.927 | 27.7 | 13.2 |
| 14 | 2A | 1.5 | DEAC | 1.0 | 2020 | 3.2 | 0.922 | 28.1 | 20.6 |
| 15 | 1 | 1.5 | EADC | 1.0 | 3260 | 3.2 | 0.922 | 28.4 | 25.2 |

[a]All catalysts contain Mg/SiOH molar ratio of 3.0

EXAMPLE 16

(Polymerization in Fluid Bed Reactor)

The catalysts of Example 2 (Comparative) and Example 1 (invention) were examined in a pilot plant, fluid-bed, gas-phase reactor. TEAL or TMA were used as activators. The results are shown below:

TABLE 4

| Run No. | Catalyst of Example | Productivity (a) | Activator | 1-hexene: ethylene (b) |
|---|---|---|---|---|
| (1) | 1 (Invention) | 10.0 | TMA | 0.124 |
| (2) | 2 | 7.1 | IMA | 0.156 |
| (3) | 2 | 3.7 | TEAL | 0.218 |

(a) gms PE/gm catalyst
(b) Molar ratio required to produce a polymer with a density of 0.917 gms/cc at $I_2$ = 1.0 g/10 min.

The data of Examples 4–15 shows that the modification of the catalyst precursor composition of this invention by the addition thereto of a halogenated alkyl aluminum compound, such as diethylaluminum chloride or ethylaluminum dichloride, substantially increases the productivity of the catalyst composition. The productivity is especially high with catalyst compositions activated with the TMA activator.

Additionally, the modification of the catalyst precursor with a halogenated alkyl aluminum also improves 1-hexene incorporation (Example 16) properties of the catalyst composition, as evidenced by the reduced amount of 1-hexene necessary to achieve a copolymer of substantially the same density as shown in Table 4. The catalyst of this invention activated with TMA is significantly more productive and requires a much lower concentration of 1-hexane than the comparative catalyst to produce a copolymer with a density of 0.917 gms/cc and $I_2$ of 1.0 g/10 min.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. A process for preparing a supported alpha-olefin polymerization catalyst composition which comprises the steps of:
   (i) contacting a slurry of a solid, porous carrier and a non-polar solvent with at least one organomagnesium composition having the formula $$R_m MgR_n'  \qquad (I)$$

where R and R' are the same or different $C_4$–$C_{12}$ alkyl groups, m and n are each 0, 1 or 2, provided that m+n is equal to the valence of Mg;
   (ii) contacting the slurry of step (i) with at least one compound of the formula $$R^2\text{—OH} \qquad (II)$$

where $R^2$ is a $C_1$–$C_{10}$ alkyl group or a $C_1$–$C_{10}$ halogenated alkyl group;
   (iii) contacting the slurry of step (ii) with at least one transition metal compound soluble in the non-polar solvent;
   (iv) contacting the slurry of step (iii) with at least one halogenated alkyl aluminum compound of the formula $$R_y^3 AlX_{(3-y)} \qquad (III)$$

where $R^3$ is a $C_1$–$C_{10}$ alkyl group, X is Cl, Br or I and y is 1 or 2; and
   (v) combining the product of step (iv) with trimethylaluminum.

2. A process of claim 1 wherein R and R' are $C_4$–$C_{10}$ alkyl groups.

3. A process of claim 2 wherein R and R' are $C_4$–$C_8$ alkyl groups.

4. A process of claim 3 wherein R and R' are each butyl groups, m is 1 and n is 1.

5. A process of claim 4 wherein the non-polar solvent is a hydrocarbon which is a liquid at ambient conditions.

6. A process of claim 5 wherein $R^2$ is a $C_1$–$C_8$ alkyl group.

7. A process of claim 6 wherein $R^2$ is a methyl, ethyl, propyl or butyl group.

8. A process of claim 7 wherein the transition metal compound is a compound of titanium or vanadium.

9. A process of claim 8 wherein the transition metal compound is titanium halide.

10. A process of claim 9 wherein the titanium halide is titanium tetrahalide.

11. A process of claim 10 wherein the titanium tetrahalide is $TiCl_4$.

12. A process of claim 10 wherein the amount of the $TiCl_4$ present in said step (iii) is such that the molar ratio of Mg to Ti is about 1 to about 3.

13. A process of claim 12 wherein the amount of the $TiCl_4$ present in said step (iii) is such that the molar raio of Mg to Ti is about 2 to about 3.

14. A process of claim 13 wherein the solid, porous carrier contains OH groups.

15. A process of claim 14 wherein the amount of the organomagnesium composition used in said step (i) is such that the molar ratio of Mg:OH is about 1:1 to about 6:1.

16. A process of claim 15 wherein the amount of the organomagnesium composition used in said step (i) is such that the molar ratio of Mg:OH is about 2:1 to about 4:1.

17. A process of claim 16 wherein the amount of the organomagnesium composition used in said step (i) is such that the molar ratio of Mg:OH is about 2.5:1 to about 3.5:1.

18. A process of claim 17 wherein the amount of the organomagnesium composition used in said step (i) is such that the molar ratio of Mg:OH is about 3:1.

19. A process of claim 18 wherein the solid, porous carrier is silica which, prior to contact thereof with the solvent in said step (i), is heated at a temperature of at least about 600° C.

20. A process of claim 19 wherein the silica is heated at a temperature of about 600° C.

21. A process of claim 20 wherein the silica has, after the heating, surface hydroxyl group concentration of about 0.5 mmoles/gr, a surface area of 300 m²/gram and a pore volume of 1.65 m³/gram.

22. A process of claim 21 wherein $R^3$ is a $C_1$-$C_4$ alkyl group and X is Cl.

23. A process of claim 22 wherein the compound of the formula (III) is diethylaluminum chloride.

24. A process of claim 22 wherein the compound of the formula (III) is ethylaluminum dichloride.

25. A supported alpha-olefin polymerization catalyst composition prepared by:
(i) contacting a slurry of a solid, porous carrier and a non-polar solvent with at least one organomagnesium composition having the formula

where R and R' are the same or different $C_4$-$C_{12}$ alkyl groups, m and n are each, 0, 1 or 2, provided that m+n is equal to the valence of Mg;
(ii) contacting the slurry of step (i) with at least one compound of the formula $$R^2-OH \qquad (II)$$

where $R^2$ is a $C_1$-$C_{10}$ alkyl group or a $C_1$-$C_{10}$ halogenated alkyl group;
(iii) contacting the slurry of step (ii) with at least one transition metal compound soluble in the non-polar solvent;
(iv) contacting the slurry of step (iii) with at least one halogenated alkyl aluminum compound of the formula

where $R^3$ is a $C_1$-$C_{10}$ alkyl group, X is Cl, Br or I and y is 1 or 2; and
(v) combining the product of step (iv) with trimethylaluminum.

26. A catalyst composition of claim 25 wherein R and R' are $C_4$-$C_{10}$ alkyl groups.

27. A catalyst composition of claim 26 wherein R and R' are $C_4$-$C_8$ alkyl groups.

28. A catalyst composition of claim 27 wherein R and R' are each butyl groups, m is 1 and n is 1.

29. A catalyst composition of claim 28 wherein the non-polar solvent is a hydrocarbon which is a liquid at ambient conditions.

30. A catalyst composition of claim 29 wherein $R^2$ is a $C_1$-$C_8$ alkyl group.

31. A catalyst composition of claim 30 wherein $R^2$ is a methyl, ethyl, propyl or butyl group.

32. A catalyst composition of claim 29 wherein the transition metal compound is a compound of titanium or vanadium.

33. A catalyst composition of claim 32 wherein the transition metal compound is titanium halide.

34. A catalyst composition of claim 33 wherein the titanium halide is titanium tetrahalide.

35. A catalyst composition of claim 34 wherein the titanium tetrahalide is TiCl₄.

36. A catalyst composition of claim 35 wherein the amount of the TiCl₄ present in said step (iii) is such that the molar ratio of Mg to Ti is about 1 to about 3.

37. A catalyst composition of claim 36 wherein the amount of the TiCl₄ present in said step (iii) is such that the molar ratio of Mg to Ti is about 2 to about 3.

38. A catalyst composition of claim 37 wherein the solid, porous carrier contains OH groups.

39. A catalyst composition of claim 38 wherein the amount of the organomagnesium composition used in said step (i) is such that the molar ratio Mg:OH is about 1:1 to about 6:1.

40. A catalyst composition of claim 39 wherein the amount of the organomagnesium composition used in said step (i) is such that the molar ratio Mg:OH is about 2:1 to about 4:1.

41. A catalyst composition of claim 40 wherein the amount of the organomagnesium composition used in said step (i) is such that the molar ratio Mg:OH is about 2.5:1 to about 3.5:1.

42. A catalyst composition of claim 41 wherein the amount of the organomagnesium composition used in said step (i) is such that the molar ration Mg:OH is about 3:1.

43. A catalyst composition of claim 42 wherein the solid, porous carrier is silica which, prior to contact thereof with the solvent in said step (i), is heated at a temperature of at least about 600° C.

44. A catalyst composition of claim 43 wherein the silica is heated at a temperature of about 600° C.

45. A catalyst composition of claim 44 wherein the silica has, after the heating, surface hydroxyl groups concentration of about 0.5 mmoles/gr, a surface area of 300 m²/gram and a pore volume of 1.65 m³/gram.

46. A catalyst composition of claim 45 wherein $R^3$ is a $C_1$14 $C_4$ alkyl group and X is Cl.

47. A catalyst composition of claim 46 wherein the compound of formula (III) is diethylaluminum chloride.

48. A catalyst composition of claim 46 wherein the compound of formula (III) is ethylaluminum dichloride.

49. A process of claim 1 wherein in said step (i) only such an amount of the organomagnesium composition is used which will be deposited onto the carrier; in said step (ii) only such an amount of the compound of the formula (II) is used which is sufficient to convert substantially all of the magnesium alkyl groups on the carrier to magnesium-alkoxy groups, so that substantially no excess of the formula (II) compound is present in the non-polar solvent after substantially all of the magnesium groups are converted to the magnesium alkoxy groups; in said step (iii) such an amount of the transition metal compound is used which is not greater than that which can be deposited on the carrier; and in said step (iv) such an amount of the halogenated alkyl aluminum compound is used which is not greater than that which can be deposited onto the carrier.

50. A process of claim 8 wherein the amount of the transition metal compound present in said step (iii) is such that the molar ratio of Mg to the transition metal is about 1 to about 3.

51. A process of claim 50 wherein the amount of the transition metal compound present in said step (iii) is such that the molar ratio of Mg to the transition metal is about 2 to about 3.

52. A process of claim 22 wherein the amount of the halogenated alkyl aluminum compound in said step (iv) is such that the molar ratio of Al:transition metal in the catalyst composition is about 0.1 to about 10.

53. A process of claim 52 wherein the amount of the halogenated alkyl aluminum compound in said step (iv) is such that the molar ratio of Al:transition metal in the catalyst composition is about 0.5 to about 5.

54. A process of claim 53 wherein the amount of the halogenated alkyl aluminum compound in said step (iv) is such that the molar ratio of Al:transition metal in the catalyst composition is about 1.0 to about 2.0.

55. A process of claim 54 wherein the product of said step (iv), prior to conducting said step (v), is dried at about 40° to about 65° C.

56. A process of claim 55 wherein the product of said step (iv), prior to conducting said step (v), is dried at about 45° to about 55° C.

57. A process of claim 56 wherein the product of said step (iv), prior to conducting said step (v), is dried at about 55° C.

58. A catalyst composition of claim 25 wherein in said step (i) only such an amount of the organomagnesium composition is used which will be deposited onto the carrier; in said step (ii) only such an amount of the compound of the formula (II) is used which is sufficient to convert substantially all of the magnesium alkyl groups on the carrier to magnesium-alkoxy groups, so that substantially no excess of the formula (II) compound is present in the non-polar solvent after substantially all of the magnesium groups are converted to the magnesium alkoxy groups; in said step (iii) such an amount of the transition metal compound is used which is not greater than that which can be deposited on the carrier; and in said step (iv) such an amount of the halogenated alkyl aluminum compound is used which is not greater than that which can be deposited onto the carrier.

59. A catalyst composition of claim 32 wherein the amount of the transition metal compound present in said step (iii) is such that the molar ratio of Mg to the transition metal is about 1 to about 3.

60. A catalyst composition of claim 59 wherein the amount of the transition metal compound present in said step (iii) is such that the molar ratio of Mg to the transition metal is about 2 to about 3.

61. A catalyst composition of claim 46 wherein the amount of the halogenated alkyl aluminum compound in said step (iv) is such that the molar ratio of Al:transition metal in the catalyst composition is about 0.1 to about 10.

62. A catalyst composition of claim 61 wherein the amount of the halogenated alkyl aluminum compound in said step (iv) is such that the molar ratio of Al:transition metal in the catalyst composition is about 0.5 to about 5.

63. A catalyst composition of claim 62 wherein the amount of the halogenated alkyl aluminum compound in said step (iv) is such that the molar ratio of Al:transition metal in the catalyst composition is about 1.0 to about 2.0.

64. A catalyst composition of claim 63 wherein the product of said step (iv), prior to conducting said step (v), is dried at about 40° to about 65° C.

65. A catalyst composition of claim 64 wherein the product of said step (iv), prior to conducting said step (v), is dried at about 45° to about 55° C.

66. A catalyst composition of claim 65 wherein the product of said step (iv), prior to conducting said step (v), is dried at about 55° C.

* * * * *

UNITED STATES PATENT AND TRADEMARK OFFICE
CERTIFICATE OF CORRECTION

PATENT NO. : 4,833,111

DATED : May 23, 1989

INVENTOR(S) : Thomas E. Nowlin

It is certified that error appears in the above-identified patent and that said Letters Patent is hereby corrected as shown below:

Col. 1, line 41, delete "comound" and insert --compound-- therefor.
Col. 1, line 62, delete "(1060)" and insert --(1960)-- therefor.
Col. 3, line 66, delete "polymerizaion" and insert --polymerization-- therefor.
Col. 4, line 44, delete "suprisingly" and insert --surprisingly-- therefor.
Col. 8, line 3, delete "preferaly" and insert --preferably-- therefor.
Col. 8, line 7, delete "alumimum" and insert --aluminum-- therefor.
Col. 10, line 12, delete "dividied" and insert --divided-- therefor.
Col. 10, line 30, delete "1-hexane" and insert --1-hexene-- therefor.
Col. 11, line 24, delete "halogentated" and insert --halogenated-- therefor.
Col. 12, line 3, delete "MgR$_3$SiOH" and insert --MgR$_2$/SiOH-- therefor.
Col. 13, line 48, delete "1-hexane" and insert --1-hexene-- therefor.
Col. 16, line 52, delete "C$_1$14C$_4$" and insert --C$_1$-C$_4$-- therefor.

Signed and Sealed this

Sixth Day of March, 1990

Attest:

JEFFREY M. SAMUELS

Attesting Officer     Acting Commissioner of Patents and Trademarks